(12) United States Patent
Naudus et al.

(10) Patent No.: US 7,023,863 B1
(45) Date of Patent: Apr. 4, 2006

(54) APPARATUS AND METHOD FOR PROCESSING ENCRYPTED PACKETS IN A COMPUTER NETWORK DEVICE

(75) Inventors: Stanley T. Naudus, Springfield, VA (US); Vijay Nadkarni, Sunnyvale, CA (US); Thomas A. Gentles, Algonquin, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 10/922,647

(22) Filed: Aug. 19, 2004

Related U.S. Application Data

(63) Continuation of application No. 09/429,716, filed on Oct. 29, 1999.

(51) Int. Cl.
*H04L 12/28* (2006.01)
*H04L 12/56* (2006.01)

(52) U.S. Cl. ................. 370/401; 370/352; 370/356; 713/161; 713/160

(58) Field of Classification Search ............. 370/352, 370/356, 401, 526, 473, 474; 379/88.17, 379/88.24, 93.26, 418; 713/160, 150, 153, 713/154, 161
See application file for complete search history.

(56) References Cited

U.S. PATENT DOCUMENTS

| | | | | |
|---|---|---|---|---|
| 6,055,236 A | * | 4/2000 | Nessett et al. | 370/389 |
| 6,078,953 A | * | 6/2000 | Vaid et al. | 709/223 |
| 6,253,321 B1 | * | 6/2001 | Nikander et al. | 713/160 |
| 6,259,691 B1 | * | 7/2001 | Naudus | 370/352 |
| 6,304,574 B1 | * | 10/2001 | Schoo et al. | 370/401 |
| 6,353,614 B1 | * | 3/2002 | Borella et al. | 370/389 |
| 6,904,280 B1 | * | 6/2005 | Siegel | 455/431 |
| 6,918,034 B1 | * | 7/2005 | Sengodan et al. | 713/160 |

* cited by examiner

*Primary Examiner*—Wellington Chin
*Assistant Examiner*—Chuong Ho
(74) *Attorney, Agent, or Firm*—McDonnell Boehnen Hulbert & Berghoff LLP

(57) ABSTRACT

Disclosed is an architecture for a network access server wherein a switching device is placed between a network gateway device and a first network, where the switching device detects the presence or absence of a security protocol field in the header information of data packets received from the first network and routes the data packets accordingly. When the security protocol field is absent, the switching device routes the data packet to the network gateway device for processing in accordance with a protocol service provided by the network access server. When the security protocol field is present, the switching device decrypts the data packet, processes the data packet in accordance with the protocol service provided by the network access server, and routes the data packet to another device within the network access server on the basis of decrypted address information within the data packet.

21 Claims, 10 Drawing Sheets

APPARATUS AND METHOD FOR PROCESSING ENCRYPTED PACKETS IN A COMPUTER NETWORK DEVICE

FIELD OF INVENTION

The present invention relates to communications involving computer networks. More specifically, it relates to the processing of encrypted data packets in communications over computer networks.

BACKGROUND OF THE INVENTION

The present invention is concerned with the transfer of data, such as audio data, across multiple networks, such as over a computer network and also passing through the Public Switched Telephone Network (PSTN). A communications device frequently employed in data communications is a network access server (NAS) that is capable of receiving a plurality of simultaneous incoming calls from the PSTN and routing them to a packet switched computer network for transmission to a host computer system, or telephone or other device connected to the computer network. The network access server is also capable of handling multiple simultaneous calls from the computer network and directing them onto a communications link in the PSTN for transmission to the remote user.

FIG. 1 shows a network architecture illustrating the relationship between various call originators, a telephone network, a network access server, and a host computer system linked to the network access server via a network. A plurality of call originators 20, 22 and 24 are located at various remote locations, which transmit incoming communications to a network access server 30. Call originator 20, 22 and 24 may consist of a personal computers C1, C2 and C3, respectively, that generates digital data and transmits the data to a modems M1, M2, and M3, which modulates the data onto a telephone lines 40, 42 and 44, respectively. For the purpose of this specification, the particular type of call originators is not important, and the call originators of FIG. 1 are chosen for purposes of illustration only. The call originators have communication software that uses the PPP or SLIP protocol.

In FIG. 1, the data that is transmitted onto the telephone lines at 40, 42 and 44 is in analog form. The illustration in FIG. 1 assumes that the communication system makes use of the public switched telephone network (PSTN) 50 such as the T1 network. The calls from the call originators are digitized and placed into one of the 24 multiplexed channels of the four-wire T1 span line 51 by the telephone company and fed into the network access server 30. As used herein, the term T1 span line refers to twenty-four 64 kbps (thousand bit per second) DS0 channels that are multiplexed in the 1.544 Mbps DS1 rate, with each DS0 channel carrying the digital representation of an analog voice channel. The term "trunk," as used herein, refers to a single DS0 channel.

The digital signals representing the incoming communications are fed into the network access server 30 by the T1 span line 51 (or possibly two span lines). The network access server 30 then routes the incoming call onto the network 52. The network may be a Token ring network, Ethernet, Internet Protocol (IP), or other type of network. The host computer system 60 then receives the call and processes the call as needed. The host computer system 60 depicted in FIG. 1 consists of a variety of computers such as a personal computer C5, data storage terminal C4, and mainframe computer C3. The host computer system 60 has the capability of sending out calls via the network access server 30 to remote data terminals, such as call originators 20, 22 and 24.

U.S. Pat. No. 5,525,595 to Dale M. Walsh et al., which is fully incorporated by reference herein, describes an embodiment of an integrated network access server 30 suitable for use with the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Lucent, Cisco, and others. The invention is suitable for implementation in network access servers from the above companies, and in other similar devices.

FIG. 2 illustrates an embodiment of the network access server 30 of FIG. 1. The network access server 30 is shown in a functional block diagram form and will be described in more detail. A more detailed description of the network access server is set forth in U.S. Pat. No. 5,525,595, and the reader is directed to the '595 patent for a more exhaustive description. The network access server 30 has a chassis 70 which houses a telephone interface unit 72 which receives the incoming calls on T1 span line 51, demultiplexes the calls, and routes the calls over a high speed time division multiplexed (TDM) bus complex 74 to twelve quad modem modules 76A, 76B, etc. Each modem module 76 has four modems (not shown in FIG. 2) which demodulate the incoming calls. Thus, if there are two T1 span lines 51 incoming to the network access server 30, then there are 48 modems in all for the 48 DS0 channels incoming into the network access server 30. The connections on the TDM bus complex between the telephone interface unit and the modems are static or "nailed up" connections, and are established on power-up of the network access server 30. The TDM bus complex 74 carries data back and forth between all of the various modules of the network access server 30. A high speed parallel bus is also part of bus complex 74 and transmits data and messages in packet form, after demodulation by the modem modules, between the modem modules and the network gateway module 82.

Each modem module 76 is provided with a corresponding modem network interface module 78A, 78B, etc. The modem network interface modules 78 have four sync/async RS 232 ports 80. The RS 232 ports 80 are linked to computers of the host computer system and may be used to output the calls from the network access server 30 to the host computer.

The network access server 30 also includes a gateway application module 82, which functions as a routing and processing engine for directing calls from the network access server to the local area network and vice versa. A representative gateway application module is described in the above-referenced patent to Dale Walsh et al., U.S. Pat. No. 5,528,595, and the reader is directed to the Walsh et al. patent for a more detailed discussion. Gateway cards for use in a network access server are commercially available, such as the NetServer™ and EdgeServer™ cards from 3Com Corporation and similar devices available from other manufacturers of network access servers. A network management module 86 provides management and supervision functions for the network access server 30. The reader is directed to the patent of Rozman et al., U.S. Pat. No. 5,438,614, which is incorporated by reference herein, for a more detailed discussion of a modem management system for use in a network access server.

The telephone interface unit 72 of FIG. 2 is described in detail in the Walsh et al. '595 patent, therefore the reader is directed to the patent for a detailed discussion of its construction and functionality. The card is composed of two separate modules, an incoming call interface 105 module and an incoming call application 175 module. The interface module 105 physically receives the incoming T1 span lines, converts the signal into a digital TTL format, and delivers the signal to the network application module 175. The interface module 105 provides a channel service unit (CSU) interface which recovers clock signals and data from the incoming T1 signals, and also provides the transmission of outgoing digital telephone signals representing digital data to line T1. The application module 175 provides framing of recovered T1 data to extract the T1 DS0 channel data and then switches the channel data twenty four time slots on a TDM bus in complex 74 for distribution to the all-digital modems in the modem modules 76.

The digital modem modules 76 and 78 are also described in the Walsh et al. '595 patent in detail, therefore the reader is directed to the Walsh et al. '595 patent for a detailed discussion of the modem cards, their architecture and function, and their interfaces to the TDM bus and the parallel bus on complex 74. The cards are available commercially from 3Com Corporation, and similar modem cards are available from other manufacturers in the industry. Each module 76 contains four modems for a total of 24 modems for 6 modem cards. As a result, the network access server 30 of FIG. 2 can handle a total of 24 simultaneous full duplex channels of data communication. If two T1 span lines are inputted into telephone interface unit 72 (FIG. 2) then 12 modem modules may be provided to handle 48 simultaneous full duplex channels. Of course, additional capacity may be provided if desired.

The gateway device is typically placed at the interface between the modems connected to PSTN 50 and the computer network 52. This is shown in the architecture of another embodiment for network access server 30 illustrated in FIG. 3. In the architecture of FIG. 3, T1/ISDN interface cards 372A and 372B terminate T1 facilities 51A and 51B, respectively, that provide a connection to PSTN 50 of FIG. 1 which, in turn, serves clients 360 that operate using a real-time sensitive protocol, such as H.323 or H.324. The T1 interface cards 372A and 372B are connected to high density modems 376A and 376B, respectively. The high density modems, in turn, are connected to a packet bus 374 through which they communicate with Edgeserver gateway 382. The Edgeserver is connected to computer network 52 through which it communicates with H.323 clients 360. Note that H.323 clients 360 are exemplary and other clients using other real time sensitive protocols, such as H.324, may operate in the context of the present invention.

The network access server 30 of FIG. 3 is a high density network access server, in that each general purpose DSP or modem card 376A and 376B contains a high density DSP configuration capable of handling 23, 24 or 30 DS0 channels instead of four DS0 channels per modem card in the embodiment of FIG. 2. By providing a set of high density modem cards 376 and a robust computing platform in the network gateway 382, a single chassis can process many hundreds of calls through the device simultaneously, as compared to 24 or 48 calls in the embodiment of FIG. 2. The term "HDM" for the DSP cards 376A and 376B in FIG. 3 is an acronym for "high density modem," indicating that each card performs modem functions for a large number of channels on the telephone line, such as 23 B channels plus 1 D channel for an ISDN Primary Rate Interface, 24 DS0 channels for a T1 line and 30 channels for an E1 line.

In the embodiment of FIG. 3, each DSP card 376 has its own T1/ISDN telephone line interface 372 connected to an ISDN PRI or T1 line. The T1/ISDN telephone line interface 372 is similar in architecture and function to the interface 72 of FIG. 2, and set forth in detail in the Walsh et al. '595 patent, and is connected to the high density modem cards by a TDM bus, as further described in the Walsh et al. patent. An alternative is to provide a plurality of T1/ISDN telephone line interfaces 72 and distribute DS0 channel data to the modems via a TDM bus with extra highway lines, as described above in the embodiment of FIG. 2.

The high density DSP cards 376 are connected to the gateway card 382 via a high speed parallel packet bus 374, similar to that described in the Walsh et al. patent. The number of high density DSP cards 376 and associated telephone line interface cards 372 is essentially arbitrary, but 10 to 24 such cards are typical in a high density network access server application today, providing modem functionality for between 240 and 576 T1 DS0 channels. The HDM cards are described in further detail below.

The gateway or EdgeServer™ card 382 consists of a general purpose computing platform (such as an IBM PC) running a stand alone or shareware network operating system such as Windows NT™ from Microsoft Corporation or UNIX. The edge server card 382 contains software and hardware modules to perform call routing, modem configuration and other features as set forth and described for the gateway modules in the Walsh et al. '595 patent and the Baum et al., U.S. Pat. No. 5,577,105, also incorporated by reference herein. Further details on the design and features of the EdgeServer™ card 382 are set forth in the patent application of William Verthein et al., Ser. No. 08/813,173, the contents of which are incorporated by reference herein.

In order to facilitate data communication, industry and international standards bodies have established sets of functional requirements, conventions or rules that govern the transmission of data over both telephone and packet switched computer networks. These functional requirements or rules are known in the art as "protocols." The implementation of protocols is necessary in order to bring order and standardization to the communications field and allow equipment from diverse manufacturers to be interoperable. Some protocols are considered low level transmission media related modulation protocols, such as modulation schemes implemented in a modem, for example V.34, V.22bis, etc. Other protocols are considered higher level, and relate to such features as error control, transmission control protocols and network level routing as well as encapsulation of data. The requirements of these protocols are typically described in a "Request For Comment" document, circulated among the industry, and eventually adopted by standards bodies.

In order to process communications between the computers on a network and remote computers connected via the telephone system, processing of the higher level protocols must be performed and is often computationally intensive. Examples of higher level network control protocols are the Point-to-Point Protocol (PPP), the Serial Line Interface Protocol (SLIP), and the Real-time Transport Protocol (RTP).

RTP is a standards-track protocol that has been developed by the industry to provide end-to-end delivery for data with real-time characteristics, such as audio, video, and simulative data, over multicast or unicast network services. This protocol is described in detail in a publicly available document known as RFC 1889, January 1996, the entire contents of which are incorporated by reference herein. In the RTP, the data transport is augmented by a control protocol referred to as RTCP (Real-time Transport Control Protocol) to allow for monitoring of the data delivery in a manner scalable to large multicast networks, and to provide control and identification functionality. The RTP and RTCP are designed to be independent of the underlying transport and network layers in the OSI model. In one approach, the processing of the RTP and RTCP protocols for each call passing through the network access server 30 is distributed between the gateway or EdgeServer card 382 of FIG. 3 and the DSP platform in the HDM cards 376.

The RTP has header fields that are either fixed or deterministically varying, with a certain format described in the RFC 1889 document. These fields include fields for a sequence number, timestamp, synchronization source identifiers, and contributing source identifiers. The header can be extended with RTP header extension to provide new payload-format-independent functions that require additional information to be carried in the RTP data packet header. Additionally, the RTCP packets have a packet format and header fields for control information.

The network access server 30 of FIG. 3 is an effective platform in which to direct calls to between remote and network endpoints of a call using RTP. The software and hardware functionality of the HDM DSP platform and the EdgeServer platform is distributed in the manner shown in FIG. 4. The telephone line interface cards 372 of FIG. 3 perform PSTN access functionality, including T1 signaling, call supervision (E&M, Loop Start, Ground Start), time slot routing and T1 framing, ISDN signaling and B-channel routing. The HDM cards 376 perform information flow processing, including tagging and delivery of audio and control components, a portion of the processing of the RTP (described below), audio transcoding in accordance with the G.771 standard (or G.723 or G.729), and other audio processing functions (e.g., DTMF generation, echo cancellation, etc.). The EdgeServer 382 or gateway platform performs call management, a portion of the RTP processing (described below), H.245 processing, H.225 processing, Internet Protocol (IP) routing, and gateway to HDM coordination protocol processing.

The arrows above the blocks in FIG. 4 indicate specific data forms for an Internet telephony session that are directed between the telephone line interface card 372, HDM DSP card 376, and EdgeServer card 382 for both inbound and outbound data. For data going between the packet switched computer network, such as network 52 of FIG. 1, and the PSTN (referred to herein as outbound data), asynchronous H.323 over IP data is received at the EdgeServer card 382. Audio frames/Protocol Data Units (PDUs) and modem control information is passed in packet form from the EdgeServer card to the high density modem card via the packet bus 374 of FIG. 3. The HDM DSP platform in the modem card 376 performs additional RTP processing and other audio processing described herein, including jitter buffering, G.711, G.723 and G.729 transcoding, and T1/ISDN signaling. The data is sent in PCM (pulse code modulated) form from the HDM card to the telephone line interface 372 over the TDM bus (FIG. 3), framed into T1 or ISDN PRI frames, and sent on the PSTN for transmission to the destination.

FIG. 5 illustrates the data flows for an embodiment of a distributed RTP processing architecture for the network access server embodiment of FIG. 3. Sources of audio/video or other real time data, such as a plurality of H.323 or H.324 personal computers, are located on the packet switched LAN or WAN 52 connected to the network access server 30. The data from the clients 360 comes into the EdgeServer 382 as LAN traffic (over IP).

In one embodiment, the EdgeServer card 382 handles all RTP functionality, with the exception of jitter buffer and all frame-based audio processing and generation of RTCP send and receive reports, which are performed in the HDM card 376 platforms. The actual processing performed by the EdgeServer 382 includes the handling of the creation and destruction of the audio streams as directed by the H.245 and H.225 protocol. Additionally, the gateway or EdgeServer card 382 acts as a central coordinator for the RTP streams and provides the HDMs with all the information that they need in order to provide their part of distributed RTP functionality. In one possible variation, the gateway card 382 also terminates all RTCP traffic, including termination and generation of sender reports and receive reports. IP, UDP and RTP headers are placed onto all audio frames sent to the LAN. The EdgeServer 382 fills in all RTP header fields that change on a dynamic basis. The EdgeServer also provides a translation function for software interfaces between the EdgeServer card 382 and the LAN interface, and between the card 382 and the packet bus 374. In one possible variation, the RTCP processing is distributed between the computing platform in the card 382 and the HDM card 376 platform, such that information for the send and receive reports for RTCP come from the HDM platform. The actual send and receive reports may be sent out by either the HDM modem platform in the cards 376 or by the computing platform in the gateway card 382.

Still referring to FIG. 5, the HDM 376 digital signal processor computing platform handles the processing of the RTP jitter buffer and all lower level audio processing that occurs below this level, including DTMF generation, echo cancellation and transcoding. The actual processing that is encompassed within the HDM platform includes a coordination function with the Edgeserver card to respond to its setting up new RTP session, or tearing down old sessions; providing a jitter buffer to remove any arrival jitter; perform all RTP header encapsulation and de-encapsulation functions; perform all IP and UDP header encapsulation and de-encapsulation functions; and reacting to changing Internet/Intranet conditions by changing the size of the jitter buffer.

An embodiment of distributed processing for RTP functionality between the EdgeServer and the HDM cards is shown in more detail in FIG. 6. The left hand margin shows the form in which data (such as audio data) is transmitted between the user H.323, or H.324, client on the computer network and the PSTN phone client linked to the network access server via the PSTN. As can be seen in FIG. 6, audio is sent encapsulated in an RTP header from the H.323 client all the way into the HDM platform 376. The HDM platform 376 removes the RTP headers and performs jitter buffering in a jitter buffer, with the size of the jitter buffer dynamically changed in order to deal with the bursty, asynchronous nature of packet switched data from the computer network. The modem platform 376 also performs lower level DSP processing of audio frames, including transcoding, echo cancellation, and DTMF generation. The audio data is transcoded according to the G.711 standard and sent over the PSTN to the phone client.

Still referring to FIG. 6, the outbound data from the LAN is translated through a network interface software structure 302 (such as WinSock, BSD sockets or TDI), the details of which are readily derived by persons of skill in the art. A receive RTP packet transfer module 304 operates with a Calculate RTP Receiver Reports module and advises the user H.323 client of the number of lost packets, size of the jitter, and other information per RFC 1889. The audio data encapsulated in RTP header is translated by the S-Bus interface software structure 308 (described below) and sent over the packet bus 374 (FIG. 3) to the HDM modem cards 376.

A reduced instruction set central processing unit (RISC) computing platform in the HDM card implements a similar S-bus interface software program 310 and receives the RTP audio data, and performs the jitter buffering (described below). The RISC Digital Signal Processing (DSP) computing platform 312 calculates the needed size of the jitter buffer based on LAN/WAN conditions and any intra-chassis latency. The RISC computing platform 312 removes all RTP headers and passes audio frames to the DSP computing platform 314 in the HDM card. The DSP platform removes the RTP headers and performs other lower level audio processing, including DTMF generation, echo cancellation, and ultimately the G.711, G.723 and G.729 transcoding. The inbound processing is as described in FIG. 6, with the encapsulating of audio framing with RTP headers performed by module 316.

While the embodiment of FIG. 6 shows the processing of RTCP send and receive reports on the EdgeServer card 382, it may readily be shifted to the high density modem platform in the HDM card 376. For example, the RTCP protocol processing may be distributed among the gateway platform and the DSP platform in the HDM card. Further, the information for the RTCP send and receive reports may come from the modem platform but the actual send and receive report may be generated and sent out by either the DSP platform in the HDM card or at the gateway card 382.

As is shown in FIG. 3, the gateway device 382 is typically placed at the interface between the modems 376A and 376B and computer network 52. In some network access servers, a large number of sessions on the modems may be active at any one time. This means that the gateway computing platform, e.g. the Edgeserver, in the network access server 30 can be performing a large amount of higher level processing for the data streams going to and from the modems. This results in a extremely heavy processing load on the Edgeserver and introduces latencies and delays in the call routing process. These effects combine to significantly reduce call throughput, particularly where a large volume of calls are simultaneously received or transmitted through the network access server.

As noted above, the Edgeserver 382 also performs much of the processing for the Internet Protocol (IP), such as routing of packets to the computer network from the modems and vice-versa. The IP is used to route data packets on global computer networks such as the Internet, and on many private networks such as intranets and Virtual Private Networks. It is often desirable to protect information sent with the Internet Protocol using different types of security. Using security with the Internet Protocol allows private or sensitive information to be sent over a public network with some degree of confidence that the private or sensitive information will not be intercepted, examined or altered.

Internet Protocol security (IPsec) is a protocol for implementing security for communications on networks using the Internet Protocol through the use of cryptographic key management procedures and protocols. Communications between two endpoints of an Internet Protocol traffic flow are made end-to-end-secure by the Internet Protocol security protocol on an individual Internet Protocol packet-to-packet basis. Internet Protocol security protocol entities at connection endpoints have access to, and participate in, critical and sensitive operations that make a common connection secure. See RFC 2401, November 1998, for further details regarding IPsec.

Internet Protocol security currently includes two security services, each having an associated header that is added to an Internet Protocol packet that is being protected. The two security services include an Authentication Header ("AH") and an Encapsulating Security Payload ("ESP") header. The Authentication Header provides authentication and integrity protection for an Internet Protocol packet and is described in RFC 2402, November 1998. The Encapsulating Security Payload header provides encryption protection and authentication for an Internet Protocol packet and is described in RFC 2406, November 1998.

The Internet Protocol security protocol headers are identified in a protocol field of an Internet Protocol data packet header. The Internet Protocol security protocol header specifies the type (e.g., Authentication Header or Encapsulating Security Payload) and contains a numerical value called the Security Parameter Index ("SPI"). The Security Parameter Index together with a destination Internet Protocol address and Internet Security protocol form a unique identifier used by a receiving system to associate a data packet with a construct called a "security association." The Security Parameter Index is used by the receiving system to help correctly process an Internet Protocol packet (e.g., to decrypt it, or to verify its integrity and authenticity).

Internet Protocol security establishes and uses a Security Association ("SA") to identify a secure channel between two endpoints. A Security Association is a unidirectional session between two termination endpoints. Two termination endpoints of a single Security Association define a logical session that is protected by Internet Protocol security services. One endpoint sends Internet Protocol packets, and a second endpoint receives the Internet Protocol packets. Since a Security Association is unidirectional, a minimum of two Security Associations is required for secure, bi-directional communications. It is also possible to configure multiple layers of Internet Protocol security protocols between two endpoints by combining multiple Security Associations.

FIG. 7 illustrates an unencrypted IP data packet 410. The unencrypted packet 410 includes an IP header 412 that will contain the IP addresses of the source and destination of the data packet 410. Packet 410 also includes TCP/UDP header 414 that identifies a port to which the packet is addressed. A data field 416 contains the data payload for packet 410.

When an Edgeserver 382 (FIG. 3) receives an unencrypted packet, it uses a UDP port number from TCP/UDP header 414 to route packet 410 to the appropriate HDM within the system via bus 374. This requires the Edgeserver to translate the IP address and UDP port number to a physical address within the Total Control Hub.

FIG. 8 illustrates an encrypted IPsec data packet 420 that is transported between two endpoints that run IPsec at the interface level, i.e. at the level of the HDM. The encrypted packet 420 has the IP header 412 and an IPsec header 422 that describes the security configuration, e.g. AH or ESP. However, the TCP/UDP header 414 is encrypted along with the data payload 416. Similarly, FIG. 9 illustrates an encrypted IPsec tunnel packet 430 that is transported through a tunnel between endpoints that run IPsec at the interface level and includes a tunnel header 432 that identifies the IP addresses of the source and destination IPsec firewall devices. See "Layer Two Tunneling Protocol 'L2TP' Security Extensions for Non-IP networks", P. Calhoun et al., <draft-ietf-pppext-l2tp-sec-04.txt>, July 1998, for more information regarding secure tunnels.

However, the presence of IPsec encrypted packets complicates the routing of encrypted packets. For instance, IPsec can be used with Network Address Translation (NAT), which allows subnets to exist behind a single or small number of globally unique Internet Protocol addresses. NAT is described in "The IP Network Address Translator", by P. Srisuresh and K. Egevang, Internet Engineering Task Force ("IETF"), Internet Draft <draft-rfced-info-srisuresh-05.txt>, February 1998).

In NAT, a single global Internet Protocol address is used for communication with external networks such as the Internet. Internally, a sub-network ("subnet") uses local addressing. Local addressing may be an addressing scheme that is different from Internet Protocol addressing, or a non-unique usage of Internet Protocol addresses. In either case, local addresses on a subnet are not used on the external, global Internet. When a device or node, such as an HDM 376A or 376B, using local addressing desires to communicate with the external world, its local address is translated to a common external Internet Protocol address used for communication with an external network by a network address translation device. Likewise, a packet intended for the local device or node will include the local address so as to identify the local device to which it is addressed. Thus, network address translation allows one or more global Internet Protocol addresses to be shared among a larger number of devices having local addresses.

The local address often takes the form of the TCP/UDP port number or other identifier that identifies the local device. However, when IPsec is used, the TCP/UDP port number is typically imbedded in TCP/UDP header 414 that is encrypted before transmission.

In order for the Edgeserver 382 to route encrypted packet 420 or 430 to the destination HDM 376, it must decrypt the packet to obtain the TCP/UDP header 414 information. Similarly, in the case of IP tunnel packet 430 in FIG. 9, the packet must be decrypted to obtain the inner IP address in field 412 that indicates the ultimate destination of the packet. This represents a highly computationally intensive activity that can significantly impact the call capacity of the Edgeserver 382. Alternatively, the Edgeserver 382 can route the encrypted packets, but, since it cannot see the UDP port of the packet, it must route all encrypted packets to a single HDM 376.

Therefore, the need remains for an approach that permits IPsec packets to be routed between a network access server and a network, but that does not significantly reduce the call capacity of the network access server.

SUMMARY OF THE INVENTION

In accordance with preferred embodiments of the present invention, some of the problems associated with processing secure packets in the prior art are overcome.

An embodiment of an architecture for a network access server, according to the present invention, includes a first network interface device (376A) for communicating with a first network (50) having a first protocol type, where the first network interface device has a first interface terminal for coupling to the first network and a second interface terminal. The first network device is configured to perform processing for the first protocol type for data packets exchanged between the first and second interface terminals of the first network device. A second network interface device (382) in the architecture is for communicating with a second network (52) having a second protocol type, where the second network interface device has a first interface terminal for coupling to the second network and a second interface terminal coupled to the second interface terminal of the first network device. The second network device is configured to perform processing for the second protocol type for a first type of data packet exchanged between the first and second interface terminals of the second network device. A third network interface device (500) in the architecture is for communicating with the second network (52), where the third network interface device has a first interface terminal for coupling to the second network, a second interface terminal coupled to the second interface terminal of the first network device, and a third interface terminal coupled to the first interface terminal of the second network device. The third network device is configured to perform processing for the second protocol type for a second type of data packet exchanged between the first and second interface terminals of the third network device. The third network interface device is also configured to detect reception of the first type of data packet at the first interface terminal of the third network interface device and route the first type of data packet to the third interface terminal of the third network interface device.

An embodiment of a method for processing data packets in a network access device, according to the present invention, includes receiving a data packet from a first network and determining whether the data packet has a first protocol type field in a header of the data packet. The method then involves routing the data packet to a first gateway device for processing when the data packet has the first protocol type field and routing the data packet to a second gateway device for processing when the data packet does not have the first protocol type field.

The foregoing and other features and advantages of a preferred embodiment of the present invention will be more readily apparent from the following detailed description, which proceeds with references to the accompanying drawings.

BRIEF DESCRIPTION OF THE DRAWINGS

Particular embodiments of the present invention are described below with reference to the following drawings, wherein.

DETAILED DESCRIPTION OF PREFERRED EMBODIMENTS

The present invention is directed toward an apparatus and method for processing and routing data flow through a network access server, where the data flow includes secure data streams. The final destination for a packet in the secure data streams is typically indicated in a header field that is encrypted and not available to a routing device without first decrypting the data packet. Decrypting packets before routing them can create a communication bottleneck in the network access server that degrades the performance of the server. The present invention, which helps avoid the creation of a bottleneck due to secure data streams, is discussed below in the context of several embodiments of the invention.

Figure 1:
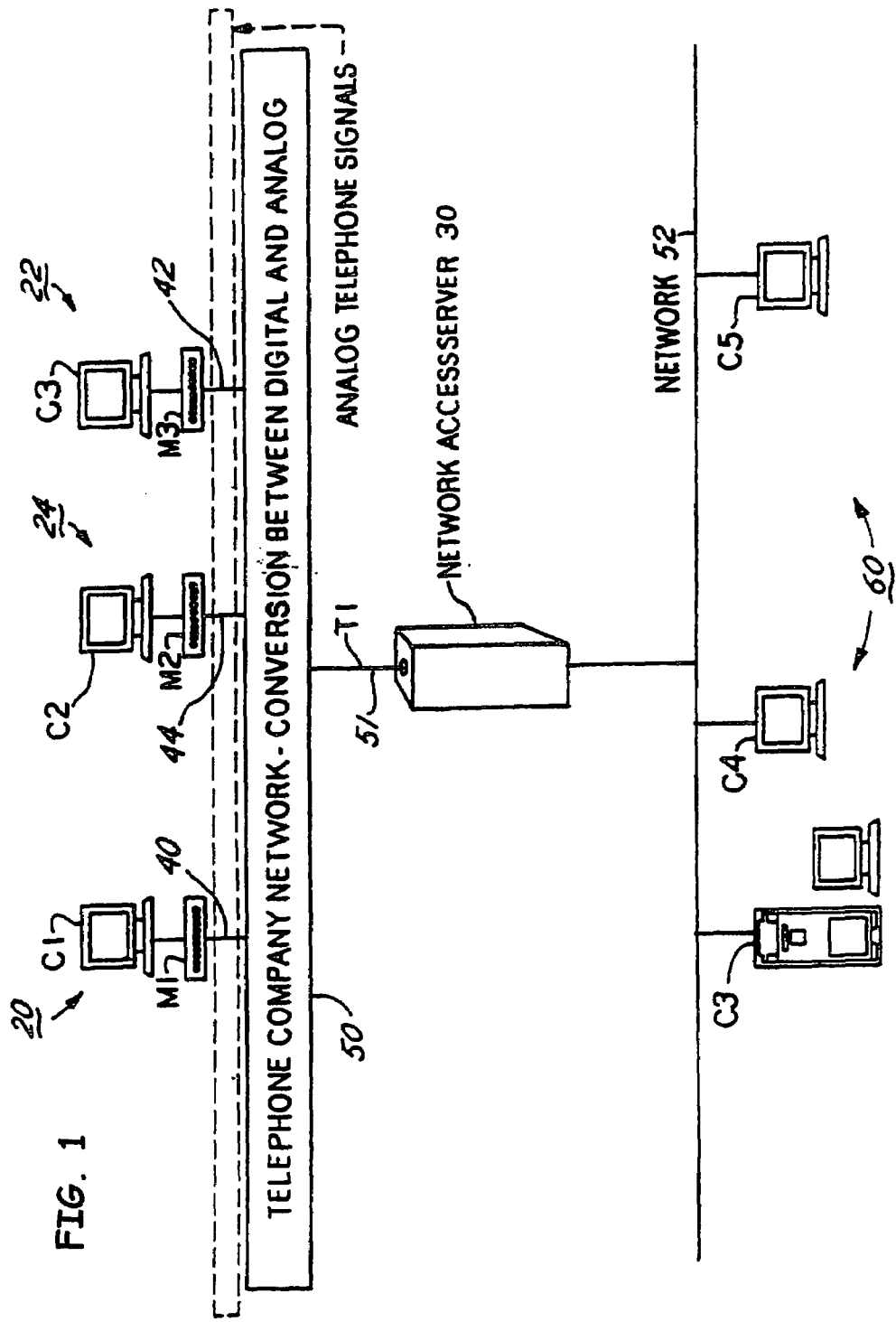
FIG. 1 is a block diagram illustrating an example of an architecture having a network access server bridging a computer network and a telephone network.
Figure 2:
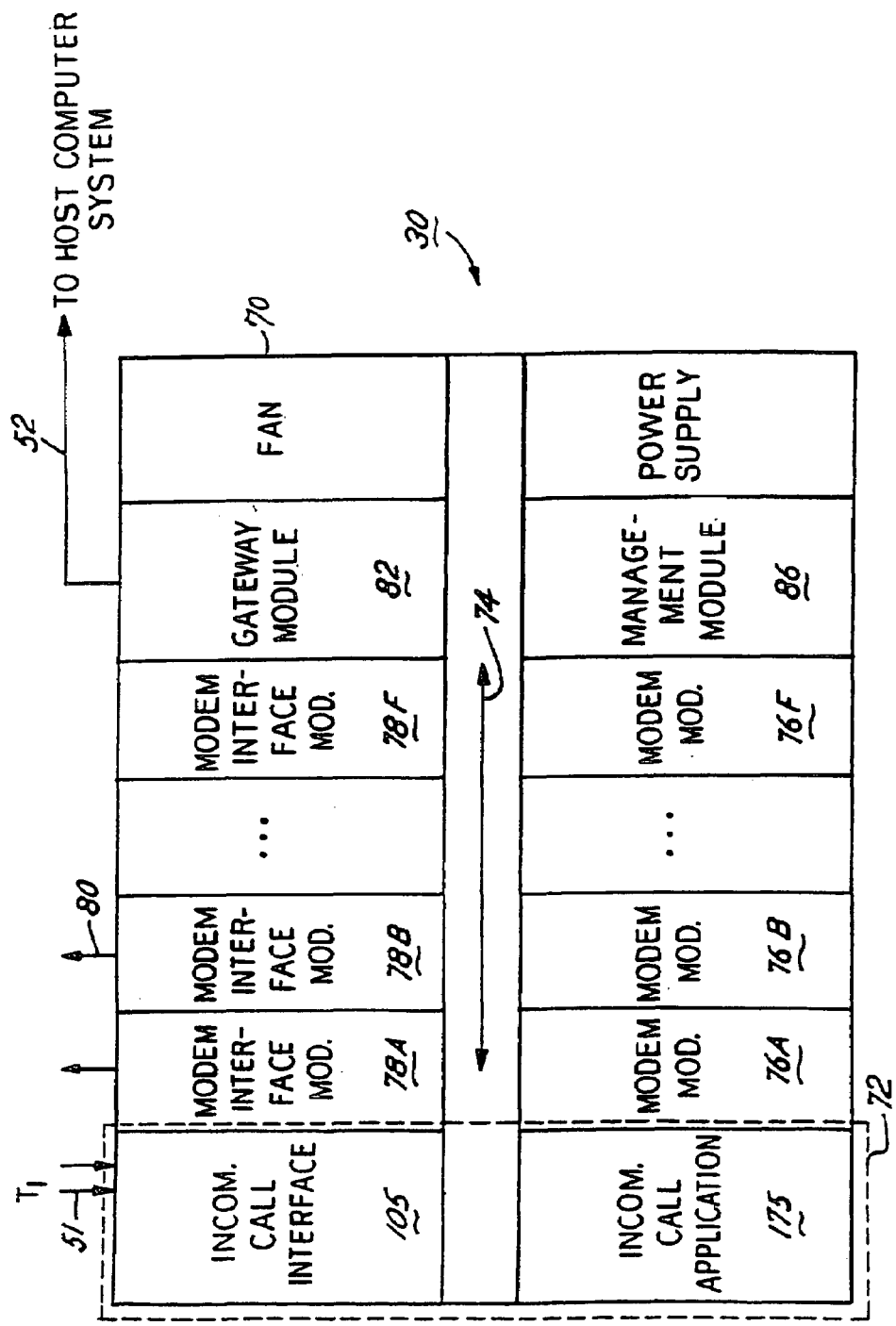
FIG. 2 is a block diagram illustrating an example of the network access server of FIG. 1.
Figure 3:
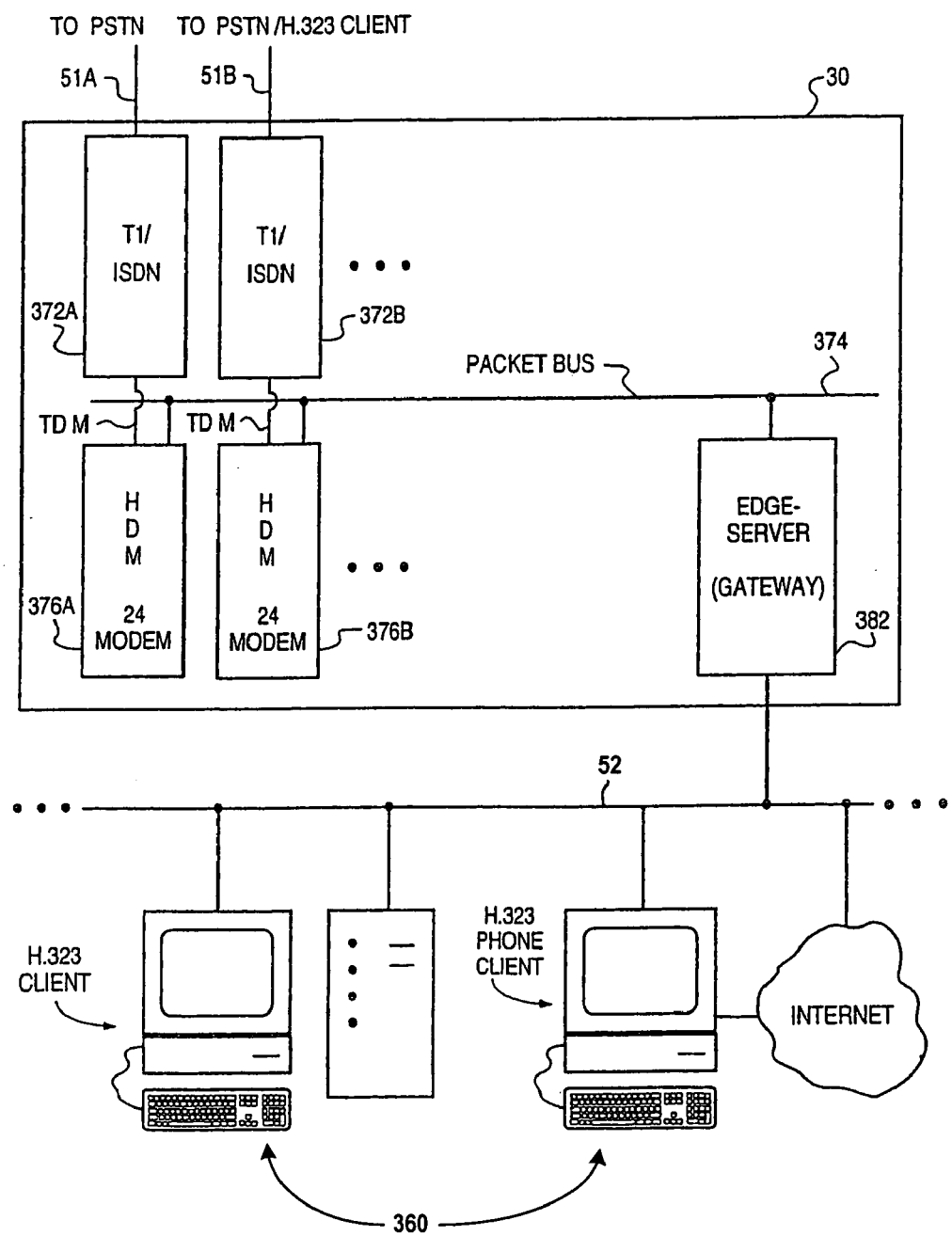
FIG. 3 is a block diagram illustrating an example of a network server architecture and its connections to the computer network and the telephone network.
Figure 4:
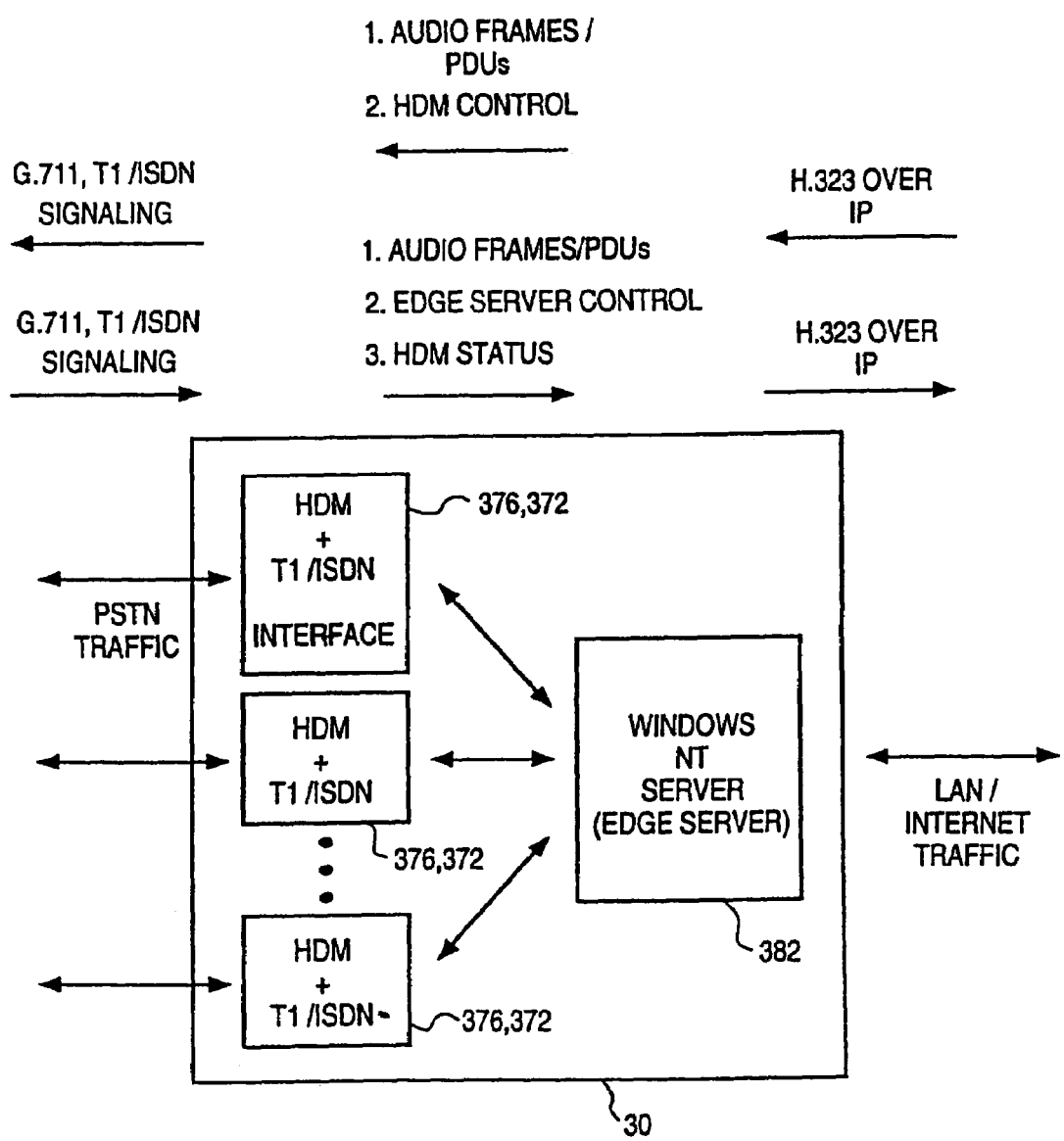
FIG. 4 is a block diagram illustrating a distribution of functionality in the network server architecture of FIG. 3.
Figure 5:
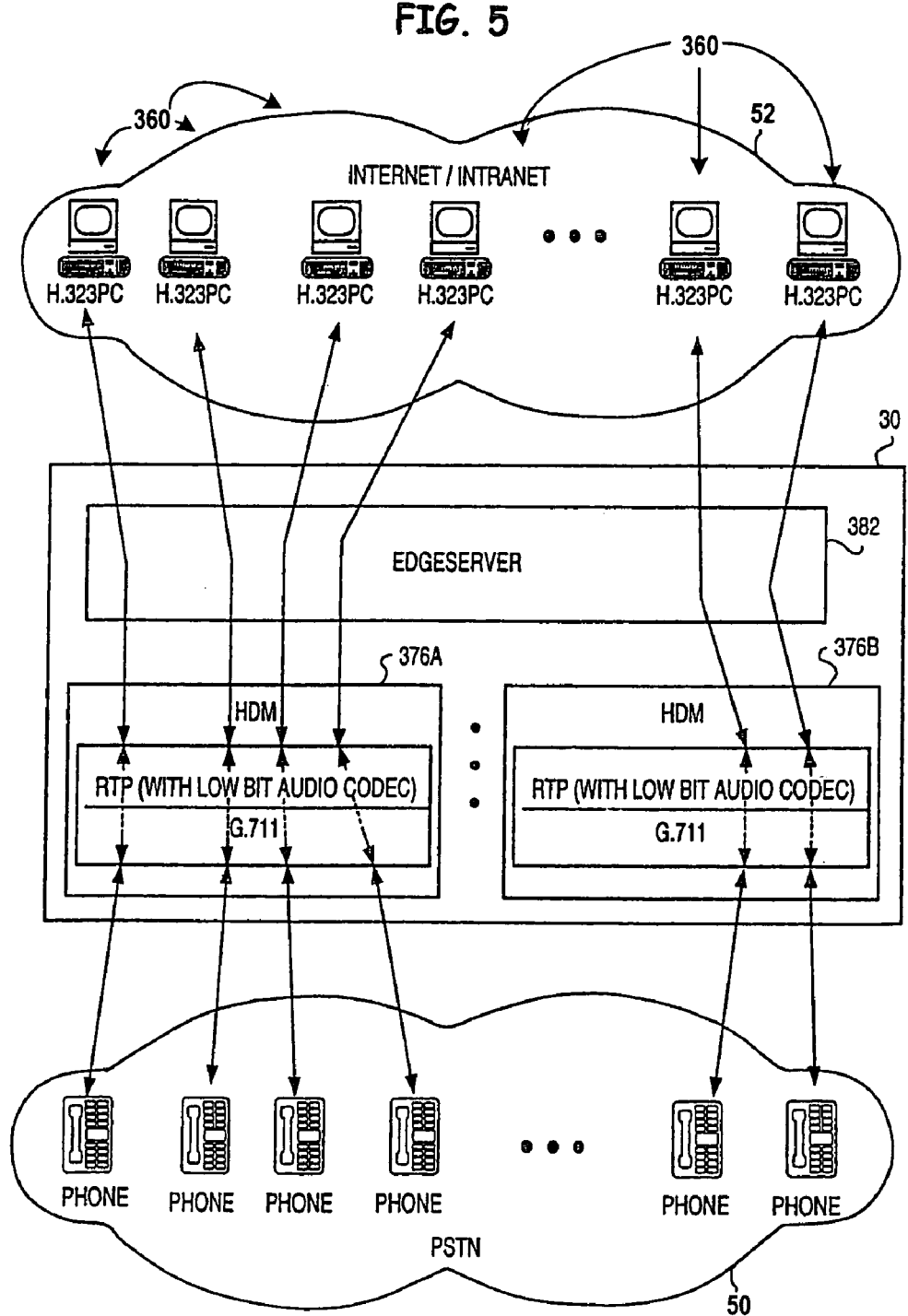
FIG. 5 is a block diagram illustrating the flow of data traffic in the arthictecture of FIG. 3.
Figure 6:
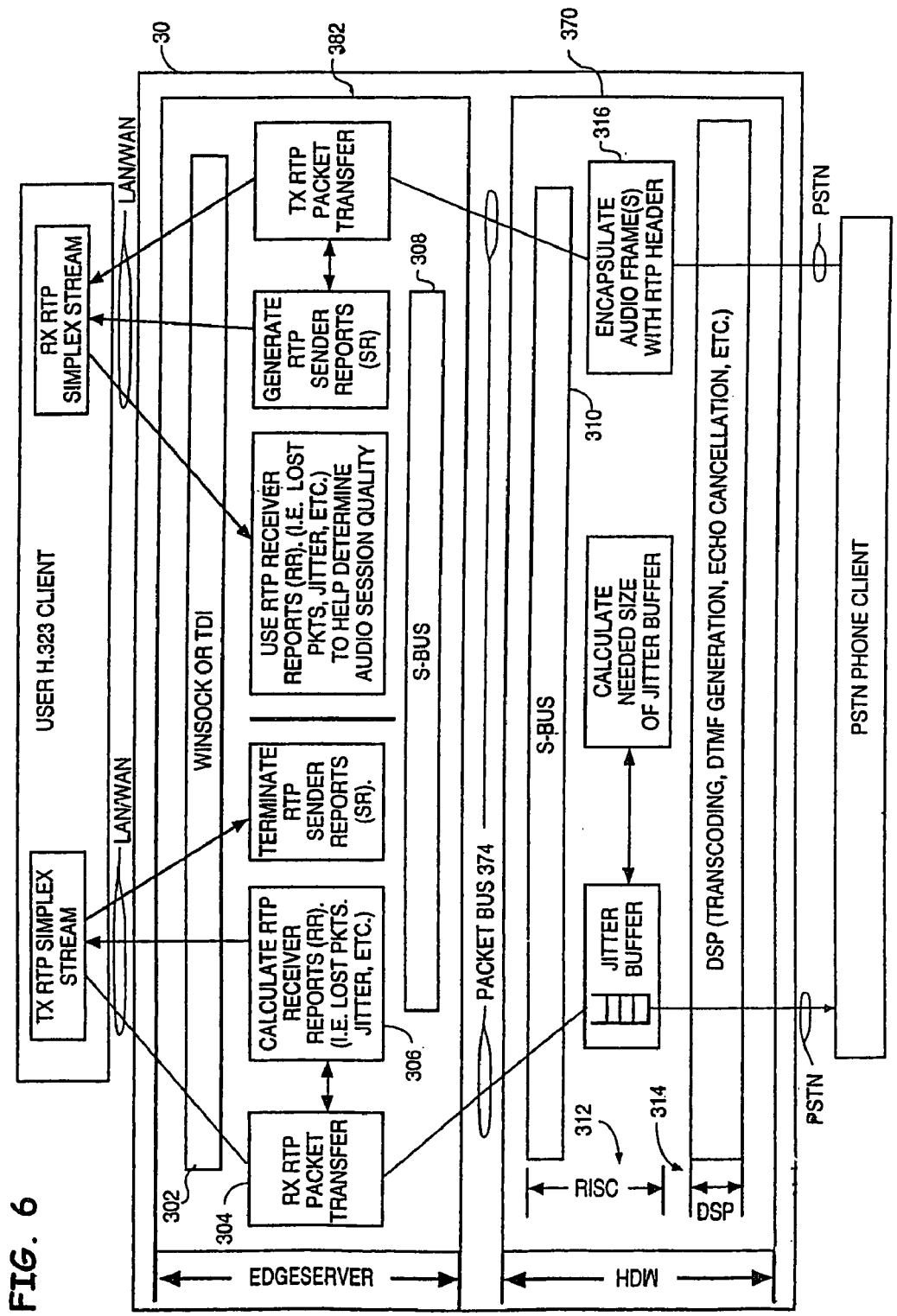
FIG. 6 is a block diagram illustrating a more detailed example of the architecture of the network access server architecture of FIG. 3.
Figure 7:
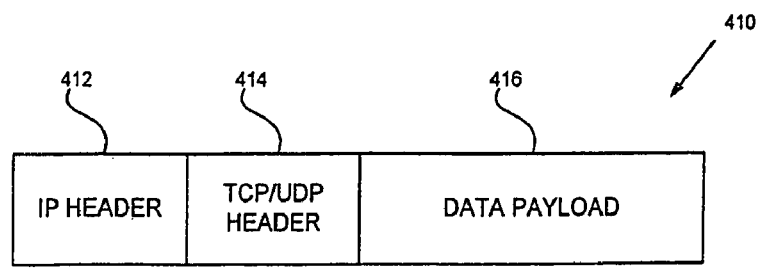
FIG. 7 is a block diagram illustrating an example of an unencrypted packet.
Figure 8:
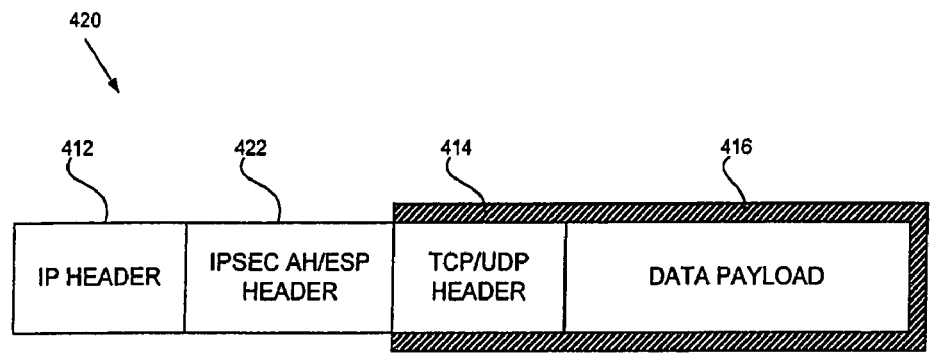
FIG. 8 is a block diagram illustrating an example of an encrypted packet.
Figure 9:
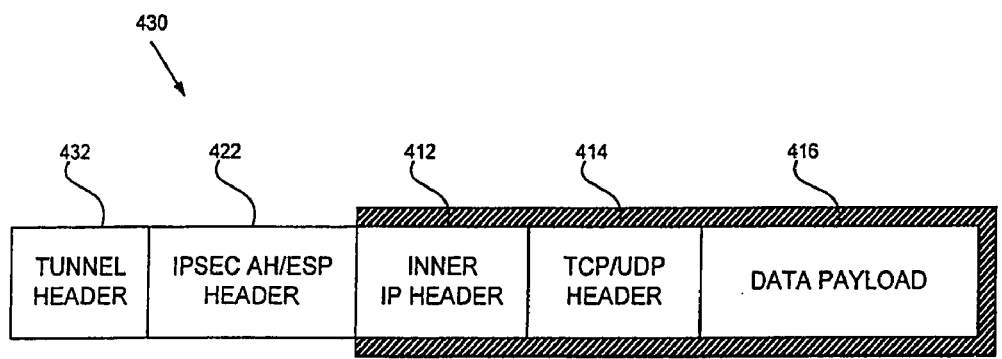
FIG. 9 is a block diagram illustrating an example of an encrypted tunnel packet.
Figure 10:
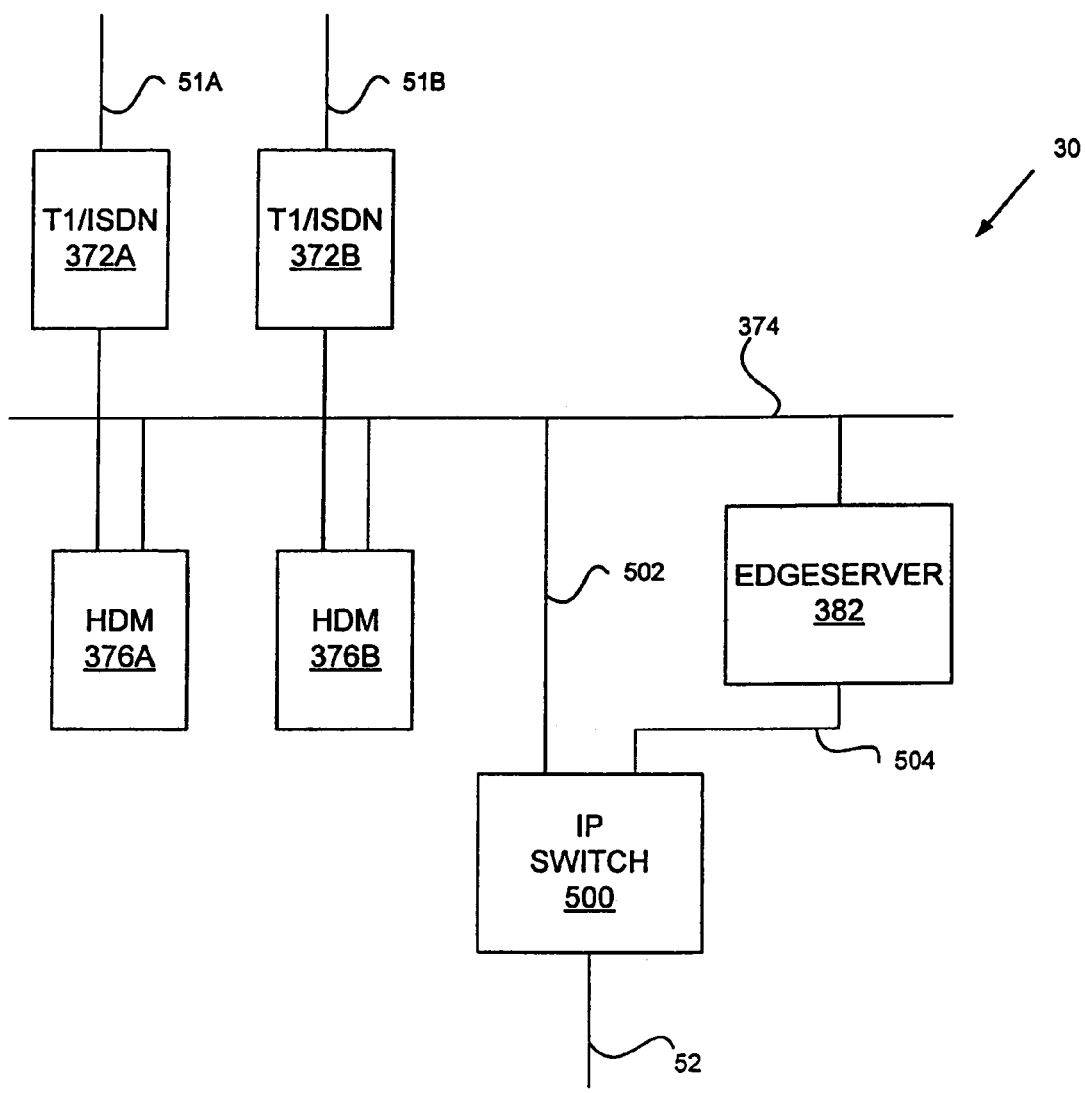
FIG. 10 is a block diagram illustrating an embodiment of an architecture according to the present invention.

FIG. 10 illustrates an embodiment of an architecture, according to the present invention, for routing both unencrypted and encrypted packets in a network access server. The network access server of FIG. 10 contains the elements of the network access server of FIG. 3, but also includes an IP switch 500. IP switch 500 is connected between Edgeserver 382 and computer network 52. IP switch 500 is also coupled to packet bus 374 whereby it communicates with HDMs 376A and 376B.

The IPsec protocols, e.g. AH and ESP, used in an encrypted IP packet are identified in a protocol field of the IP packet header. IP switch 500 receives all packets from computer network 52 that are destined for the IP address value of network access server 30. IP switch 500 will examine each IP packet received from computer network 52 to determine if the packet's protocol field contains one of the identifiers for the IPsec protocols. If the protocol field does not contain one of the IPsec protocol identifiers, then the packet is not encrypted and IP switch 500 passes the unencrypted packet to Edgeserver 382 via connection 504 for further processing of the packet as described above.

However, if the IP switch detects an IPsec protocol identifier, then IP switch 500 will decrypt the packet. See commonly assigned, co-pending U.S. patent application Ser. No. 09/271,025, herein incorporated by reference, for further details regarding processing of encrypted packets using IPsec protocols.

Once the packet is decrypted, IP switch 500 will examine the UDP port number and route the packet to the HDM 376A or 376B corresponding to the UDP port number by placing the packet on packet bus 374 via connection 502.

An advantage of the embodiment of FIG. 10 is that the IP switch 500 can be used transparently with a conventional embodiment of Edgeserver 382. IP switch 500 is interposed Edgeserver 382 and network 52 and assigned an IP address that represents network access server 30. Thus, IP switch 500 will recognize and process packets on network 52 that are destined for any of the devices present in network server 30, i.e. IP switch 500, Edgeserver 382 and HDMs 376A and 376B, because all the devices share the same IP address on network 52. Edgeserver 382 will only receive those data packets that are not encrypted. Therefore, no changes need to be made to the software stack of Edgeserver 382.

Figure 11:
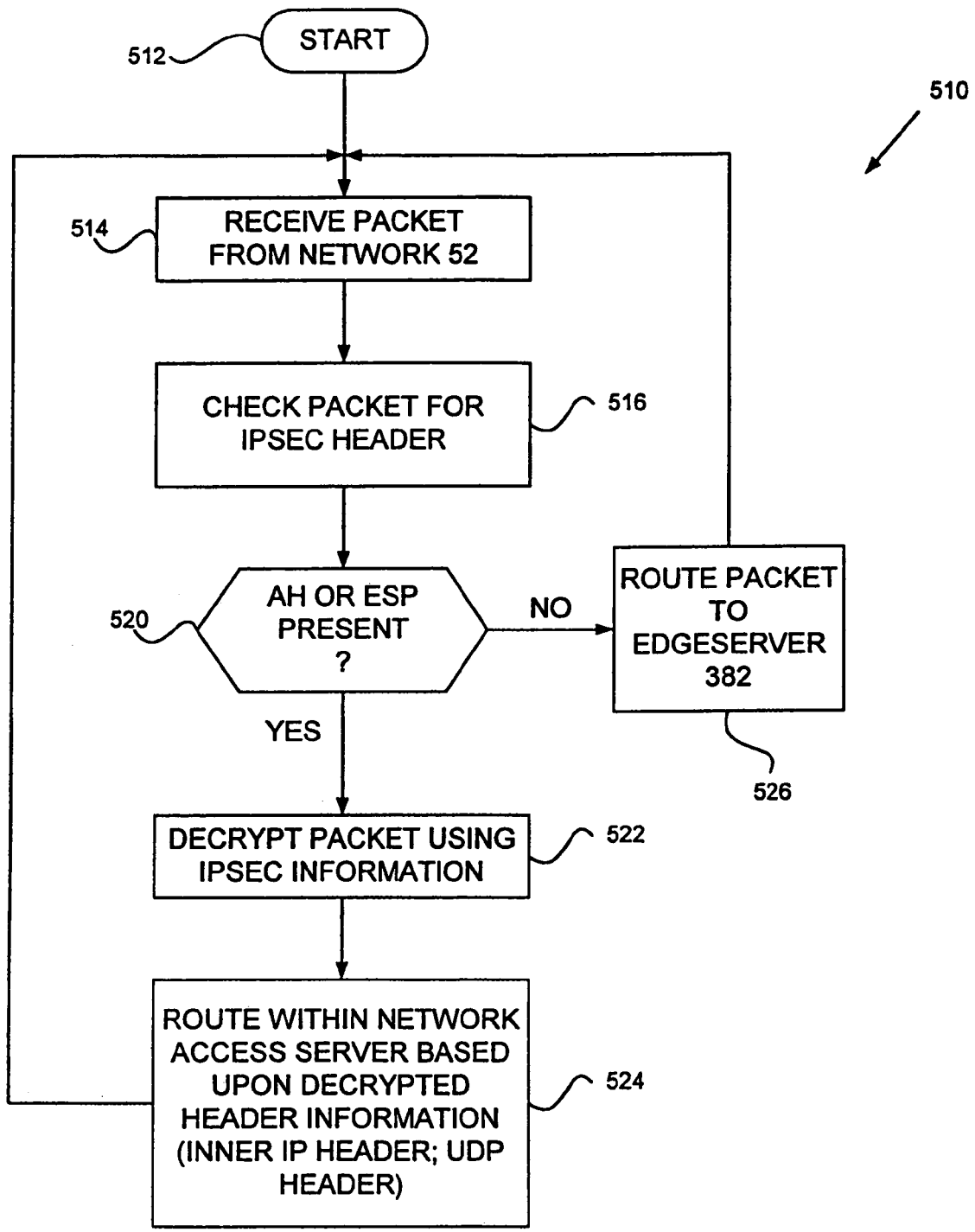
FIG. 11 is a flow diagram illustrating an embodiment of the function of the IP switch shown in FIG. 10.

FIG. 11 shows an embodiment of the method 510 performed in IP switch 500. When a packet is received from network 52 at step 52, the packet is checked, at step 516, for the presence of AH or ESP fields for IPsec in the header information for the packet. If the AH and ESP fields are absent from the packet, then control flow branches at step 520 to step 526 where the packet is routed to Edgeserver 526, which will process the header, e.g. RTP data stream processing, and route it to a port on HDM 376A or 376B for further processing and transmission onto network 51.

However, if either the AH or the ESP field is present in the packet, then control flow branches at step 520 to step 522 where the packet is decrypted using the IPsec information contained in the packet header. Once the packet is decrypted, the previously encrypted header information, such as the inner IP header for a tunnel packet or the UDP header, is used to route the packet, at step 524, to a destination with the network access server, e.g. a port on HDM 376A or 376B, indicated by the decrypted header information.

Figure 12:
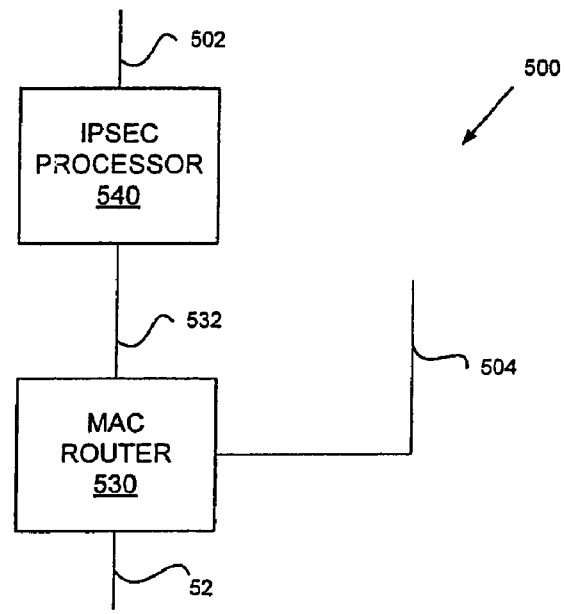
FIG. 12 is a block diagram illustrating another embodiment of the IP switch shown in FIG. 10.

An alternative embodiment for IP switch 500 according to the present invention is shown in FIG. 12. In the embodiment of FIG. 12, the functions of IP switch 500 are split between a medium access control (MAC) router 530 and an IPsec processor 540, whereas these functions are integrated into a single device in the embodiment of FIG. 10 above.

In FIG. 12, MAC router 530 is coupled to network 52 and holds the IP address for network access server 30. Thus, MAC router 530 receives packets addressed to network access server 30 and reroutes the packets to other devices within the server. When MAC router 530 receives a packet that is addressed to server 30 and does not includes an IPsec field in the header, it reroutes the packet to Edgeserver 382 via connection 504 for further processing and routing within network access server 30.

When router 530 receives a packet where an IPsec field is present in the packet header, then it routes the packet to IPsec processor 540 via connection 532. The IPsec processor 540 will decrypt the packet using the information in the IPsec field and then routes the decrypted packet within the network access server 30 over connection 502 using decrypted header information from the packet.

Figure 13:
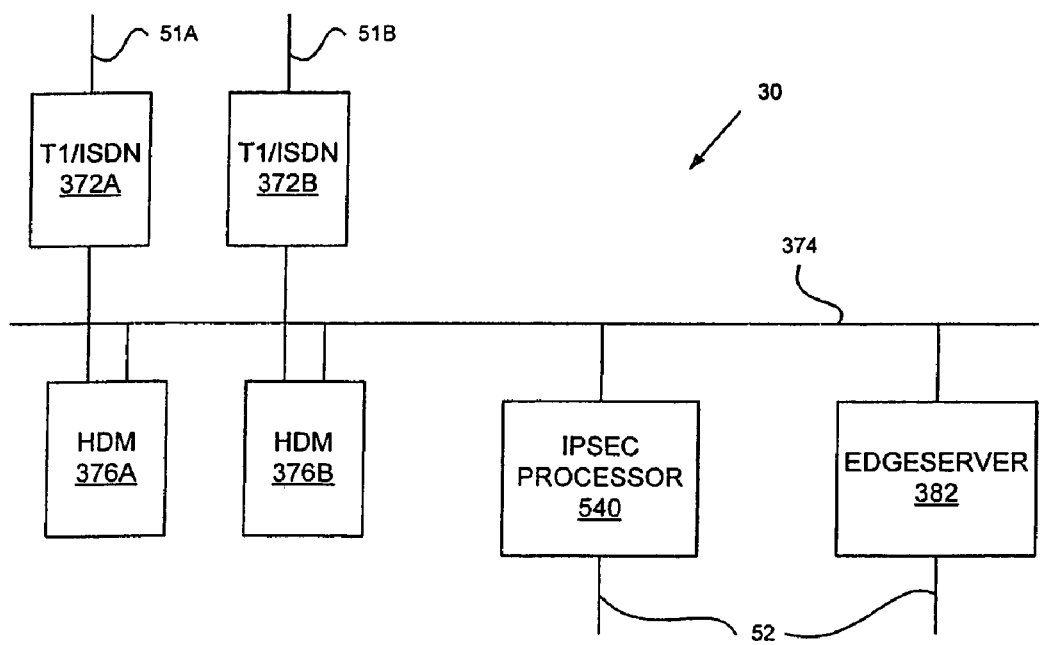
FIG. 13 is a block diagram illustrating another embodiment of an architecture according to the present invention.

Still another embodiment for IP switch 500 according to the present invention is shown in FIG. 13. In the embodiment of FIG. 13, the IPsec processor 540 and Edgeserver 382 are both directly coupled to network 52 and have different IP addresses. IPsec processor 540 is configured to receive and process encrypted packets from network 52 and route the decrypted packets within the network access server 30 via bus 374. This requires that secure connections to be set up through the IPsec processor 540 and use the IP address of the IPsec processor for all communications. Edgeserver 382 has a different IP address which is used for unencrypted traffic which is processed and routed onto bus 374.

The embodiment of FIG. 13 requires multiple IP addresses for the network access server 30, relatively complex connection control to distinguish the different types of data flow streams, and would likely require changes in the standard code in Edgeserver 382 to accommodate the more complex connection control.

The present invention helps prevent a bottleneck in a network access server caused by the computational overhead needed to decrypt data packets in secure data streams. An IP switch detects the presence or absence of a security protocol field, such as an AH or ESP field for IPsec, in the header information of a packet received from a network, such as an IP network, in order to determine whether the packet is encrypted. The IP switch forwards unencrypted packets to a network gateway device, such as an Edgeserver, for processing according to a service provided by a network access server, such as RTP/IP processing, and forwarding to other devices within the network access server, such as HDMs. When the IP switch detects the presence of the security protocol field, it decrypts the packet using the security information, processes the packet according to the service provided by the network access server, and routes the packet to other device within the network access server using decrypted header information, such as an inner IP address or UDP port, contained within the decrypted portion of the packet.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. An architecture for a network access server, the architecture comprising:
    a first network interface device for communicating with a first network having a first protocol type, where the first network interface device has a first interface terminal for coupling to the first network and a second interface terminal, and where the first network device is configured to perform processing for the first protocol type for data packets exchanged between the first and second interface terminals of the first network device;
    a second network interface device for communicating with a second network having a second protocol type, where the second network interface device has a first interface terminal for coupling to the second network and a second interface terminal coupled to the second interface terminal of the first network device, and where the second network device is configured to perform processing for the second protocol type for a first type of data packet exchanged between the first and second interface terminals of the second network device;
    a third network interface device for communicating with the second network, where the third network interface device has a first interface terminal for coupling to the second network, a second interface terminal coupled to the second interface terminal of the first network device, and a third interface terminal coupled to the first interface terminal of the second network device, and where the third network device is configured to perform processing for the second protocol type for a second type of data packet exchanged between the first and second interface terminals of the third network device, the third network interface device being further configured to detect reception of the firs type of data packet at the first interface terminal of the third network interface device and route the first type of data packet to the third interface terminal of the third network interface device; and
    wherein the first protocol type of the first network is a first real-time sensitive protocol and the second protocol type is a second real-time sensitive protocol configured to route each data packet to a destination address included in each data packet.

2. The architecture of claim 1, wherein the first protocol type is one of H.323 and H.324, and the second protocol type is IP/RTP.

3. The architecture of claim 2, wherein the first type of data packet is an unencrypted IP data packet and the second type of data packet is an encrypted data packet.

4. The architecture of claim 3, where the second type of data packet is an IPsec encrypted data packet.

5. The architecture of claim 4, where the third network interface device is configured to identify the second type of data packet by determining whether one of an AH field and an ESP field is present in a predetermined header of the second type of data packet, and where the third network interface device is further configured to detect the first type of data packet by detecting that the AH field and the ESP field are absent from the predetermined header of the first type of data packet.

6. The architecture of claim 1, wherein the second and third network interface devices share a predetermined network address on the second network.

7. The architecture of claim 1, wherein the third network interface device further comprises:
    a switching device having a first terminal coupled to the first interface terminal of the third network interface device, a second terminal, and a third terminal coupled to the third interface terminal of the third network interface device, where the switching device is configured to identify the first type of data packet received at the first terminal and route it to the third terminal and identify the second type of data packet received at the first terminal and route it to the second terminal; and
    a fourth network interface device for processing the second protocol type for the second type of data packet, where the fourth network interface device has a first terminal coupled to the second terminal of the switching device and a second terminal coupled to the second interface terminal of the third network interface device.

8. The architecture of claim 7, where the switching device holds a predetermined network address on the second network that is shared by the second and fourth network interface devices.

9. A method for processing data packets in a network access device, the method comprising the steps of:
    receiving a data packet from a first network;
    determining whether the data packet has a first protocol type field in a header of the data packet;
    routing the data packet to a first gateway device for processing when the data packet has the first protocol type field;
    routing the data packet to a second gateway device for processing when the data packet does not have the first protocol type field;
    processing the data packet for a real-time sensitive protocol in the first gateway device; and processing the data packet for a security protocol and for the real-time sensitive protocol in the second gateway device.

10. A computer readable medium having stored therein instructions for causing a central processing unit to execute the method of claim 9.

11. The method of claim 9, where the real-time sensitive protocol is RTP and the security protocol is IPsec.

12. The method of claim 9, further including the steps of:
routing the data packet to a third gateway device after processing by the first gateway device, where the third gateway device is coupled to a second network; and
routing the data packet to the third gateway device after processing by the second gateway device.

13. The method of claim 12, where the real-time sensitive protocol is RTP and the security protocol is IPsec, and including the step of processing the data packet for one of an H.323 and an H.324 protocol in the third gateway device.

14. The method of claim 9, where the step of receiving a data packet from a first network includes using a single predetermined address for receiving the data packet from the first network when the data packet has the first protocol type field in the header of the data packet and when the data packet does not have the first protocol type field in the header of the data packet.

15. A network access server for communicating between first and second networks, the server comprising:
a first gateway device for processing data flow between the first network and the network access server;
a second gateway device for processing data flow between the first gateway device and the second network;
a switching device interposed between the second gateway device and the second network for routing a first type of data packet from the second network to the second gateway device and for processing a second type of data packet from the second network and routing the second type of data packet to the first gateway; and
where the second type of data packet is an encrypted packet and where the switching device is configured to decrypt the second type of packet and route the second type of packet to the first gateway device based upon decrypted header information.

16. The network access server of claim 15, where the network access server has a single predetermined address on the second network.

17. The network access server of claim 15, where the second type of data packet is an IPsec encrypted packet and where the switching device is configured to perform IPsec decryption of the second type of packet.

18. The network access server of claim 17, where the switching device is configured to identify the second type of data packet by detecting whether one of an AH field and an ESP field is present in a predetermined header of the second type of packet.

19. The network access server of claim 17, where the switching device is configured to route the second type of packet to the first gateway device based upon a decrypted UDP header in the second type of packet.

20. The network access server of claim 19, where the first network is a PSTN and the first gateway device is configured to process one of an H.323 and an H.324 protocol.

21. The network access server of claim 20, where the second network is an internet protocol (IP) network, the second gateway device is configured to perform RTP protocol processing, and the switching device is configured to perform RTP protocol processing.

* * * * *